US000001294H

United States Statutory Invention Registration [19]

[11] Reg. Number: H1294

[43] Published: Mar. 1, 1994

Yamada et al.

[54] SILVER HALIDE PHOTOGRAPHIC EMULSION

[75] Inventors: Sumito Yamada; Tetsuo Nakamura, both of Kanagawa, Japan

[73] Assignee: Fuji Photo Film Co., Ltd., Minami-Ashigara, Japan

[21] Appl. No.: 989,508

[22] Filed: Dec. 11, 1992

Related U.S. Application Data

[63] Continuation of Ser. No. 662,591, Mar. 1, 1991, abandoned.

[30] Foreign Application Priority Data

Mar. 2, 1990 [JP] Japan ..... 2-51165

[51] Int. Cl.[5] ..... G03C 1/005; G03C 1/06

[52] U.S. Cl. ..... 430/567; 430/569; 430/604; 430/605

[58] Field of Search ..... 430/567, 569, 604, 605

[56] References Cited

U.S. PATENT DOCUMENTS

| | | | |
|---|---|---|---|
| 2,448,060 | 8/1948 | Smith et al. | 430/604 |
| 4,783,398 | 11/1988 | Takada et al. | 430/567 |
| 4,952,491 | 8/1990 | Nishikawa et al. | 430/569 |
| 5,057,402 | 10/1991 | Shiba et al. | 430/567 |
| 5,166,044 | 11/1992 | Asami | 430/567 |

*Primary Examiner*—Shean Wu

*Attorney, Agent, or Firm*—Sughrue, Mion, Zinn, Macpeak & Seas

[57] ABSTRACT

A photographic silver halide emulsion comprising silver chlorobromide grains containing at least 80 mol % silver chloride or silver chloride grains is disclosed, wherein tabular grains having a thickness of less than 0.5 μm, a diameter of at least 0.5 μm and an aspect ratio of at least 2/1 account for at least 50% of the total projected area of the silver halide grains, and the tabular grains are formed in the presence of a compound of metal belonging to Group VIII of the Periodic Table. The high silver chloride content emulsion has a sensitivity as high as that of a silver iodobromide emulsion.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC EMULSION

This is a continuation of application Ser. No. 07/662,591, filed Mar. 1, 1991, abandoned.

FIELD OF THE INVENTION

The present invention relates to a silver halide photographic emulsion, and more particularly to a tabular silver chlorobromide emulsion having a high silver chloride content or a tabular silver chloride emulsion each having high sensitivity, and which emulsions are well adapted to rapid processing.

BACKGROUND OF THE INVENTION

In photographic processing for photographic light-sensitive materials, it is desired to shorten the processing time and reduce the amount of waste solutions that are generated in processing.

A high-sensitivity negative type photographic light-sensitive material generally employs a silver iodobromide emulsion; however, in order to satisfy the above noted requirements, a silver chlorobromide emulsion or a silver chloride emulsion having a high solubility is useful. On the other hand, for reducing the amount of processing waste, it is desirable to increase the image density using a smaller amount of silver, and also it is well known in the art that tabular silver halide grains provide favorable properties with respect to sensitivity, graininess, sharpness, color sensitizing efficiency, etc.

Silver halide grains having a high silver chloride content, i.e., as high as 50 mol %, (hereinafter, "high silver chloride content grains") generally have a cubic structure. To form tabular grains having a high silver chloride content, various specific means must be employed.

Methods for preparing tabular silver chlorobromide grains are known including, for example, (1) simultaneously introducing an aqueous solution of a chloride and an aqueous solution of a silver salt in a dispersion medium in the presence of ammonia by a double jet method as described in JP-B-64-8324 (the term "JP-B" as used herein means an "examined Japanese patent publication"), (2) reacting an aqueous silver salt solution and an aqueous solution of a chloride-containing halide in the presence of aminoazaindene and a thioether bond-containing peptizer as described in JP-B-64-8326, (3) simultaneously introducing an aqueous solution of a silver salt, an aqueous solution of a chloride, and an aqueous solution of a bromide to a dispersion medium while keeping the mol ratio of chloride ion to bromide ion in the range of from 1.6:1 to 258:1, and keeping the total concentration of halogen ions in the range of from 0.10 to 0.90 normal as described in JP-A-58-111936 (the term "JP-A" as used herein means an "unexamined published Japanese patent application"), (4) introducing silver ion into a dispersion medium containing at least 0.5 molar chloride ion and a gelatin deflocculant formed from methionine of less than 30 μmol per gram as described in JP-A-62-163046, (5) contacting a chloride-containing halide and a water-soluble silver salt in a dispersion medium in the presence of a crystal habit changing amount of aminoazapyridine and the salt thereof as described in JP-A-63-281149, (6) mixing an aqueous silver salt solution and an aqueous halide solution in the presence of thiourea or a thiourea derivative or using a gold compound as described in JP-A-63-213836, (7) forming the silver halide grains in the presence of a compound having a sulfur ion in a heterocyclic ring thereof as described in JP-A-63-2043, and (8) forming the silver halide grains in the presence of a carbonyl compound containing a sulfur ion in the molecule thereof or a sulfone compound as described in JP-A-63-41845.

However, a silver chlorobromide emulsion tends to fog and has a low light sensitivity as compared to a silver iodobromide emulsion. Also, the application of a silver chlorobromide emulsion is limited to color photographic papers and light-sensitive materials for making printing plates using a relatively high intensity exposure.

For solving the above noted problems of high silver chloride content emulsions, various techniques have been proposed.

For example, JP-A-58-95736, JP-A-58-108533, JP-A-60-222844, and JP-A-60-222845 disclose that for imparting high sensitivity to a high silver chloride content emulsion, it is effective to form a grain structure having a high silver bromide content layer in the silver halide grains. The present inventors have found that although high sensitivity is obtained using these techniques, desensitization tends to occur when pressure is applied to the emulsion. Also, tabular silver halide grains having a uniform grain size distribution are difficult to prepare, such that the emulsion is not practically employed. Furthermore, it has also been found that by using these methods, it is difficult to sufficiently improve the reciprocity law failure of the high silver chloride content emulsion.

JP-A-51-139323, JP-A-59-171947 and British Patent 2,109,576A described that high sensitivity is obtained and the reciprocity law failure is improved by introducing to the silver halide emulsion a compound of a metal belonging to Group VIII of the Periodic Table.

Also, U.S. Pat. No. 4,269,927 describes that high sensitivity is obtained by incorporating cadmium, lead, zinc, or a mixture thereof in a surface latent image-type high silver chloride content emulsion having a silver chloride content of at least 80 mol %.

However, by using the above-described method, although a small increase in sensitivity and improvement in reciprocity law failure is observed, the resulting high silver chloride content emulsion does not provide practically useful performance.

Furthermore, European Patent 336426Al discloses a technique of obtaining high sensitivity by forming a high silver chloride content emulsion in the presence of six-coordinate complex of rhenium, ruthenium, or osmium having a cyan ligand.

However, the sensitivity attained is far inferior to that of a silver iodobromide emulsion which is generally used.

SUMMARY OF THE INVENTION

An object of the present invention is to provide a high silver chloride content emulsion which is well adapted to rapid processing and having a sensitivity as high as that of a silver iodobromide emulsion.

The present inventors have discovered that the above object is attained by providing a photographic silver halide emulsion comprising silver chlorobromide grains containing at least 80 mol % silver chloride or silver chloride grains, wherein tabular grains having a thickness of less than 0.5 μm, a diameter of at least 0.5 μm, and an aspect ratio of at least 2/1 account for at least 50% of the total projected area of the silver halide grains, and said tabular grains are formed in the presence of a compound of metal belonging to Group VIII of the Periodic Table.

DETAILED DESCRIPTION OF THE INVENTION

The invention is explained in detail below.

The compound of a metal belonging to group VIII of the Period Table for use in the present invention includes compounds of iron, cobalt, nickel, ruthenium, rhodium, palladium, osmium, iridium, platinum, etc., and typical examples of the compound are ferric chloride, potassium ferricyanide, cobalt chloride, cobalt nitrate, luteo salt, nickel chloride, nickel sulfate, ruthenium chloride, ruthenium hydroxide, rhodium chloride, ammonium hexachlorodinate, palladium chloride, palladium nitrate, potassium hexachloropalladate, osmium chloride, iridium chloride ($IrCl_3$ or $IrCl_4$), potassium iridate chloride, ammonium hexachloroiridate, ammonium hexachloroplatinate, and potassium hexachloroplatinate.

Of the metals belonging to Group VIII of the Periodic Table for use in the present invention, iron rhenium, ruthenium, and osmium are preferred and in particular, the six-coordination complex of iron, rhenium, ruthenium, or osmium having 4 cyan ligands as described in European Patent 336426Al exhibit an excellent effect for increasing the sensitivity.

The addition amount of the compound of a metal belonging to Group VIII of the Periodic Table is from $1\times10^{-8}$ to $1\times10^{-2}$ mol, and preferably from $1\times10^{-6}$ to $1\times10^{-3}$ mol per mol of silver halide contained in the emulsion.

In the present invention, by forming the tabular high silver chloride content grains in the presence of a compound of a metal belonging to Group VIII of the Periodic Table, the metal of Group VIII is contained in the tabular grains.

The metal of Group VIII contained in the high silver chloride content grains may be uniformly distributed over the entire grain or may be localized in the central portion of the grain, or may largely exist in the outside portion of the grain as opposed to the central portion of the grain.

In the present invention, it is preferred that the metal of Group VIII is largely present in the outside portions but not in the central portion of the grain.

The tabular high silver chloride content grains for use in the present invention may be obtained by referring to the above-described conventional methods in accordance with the intended application of the emulsion. However, a method of preparing tabular high silver chloride grains by controlling the pH of the system for forming the grains in the range of from 4.5 to 8.5 using adenine as described in Japanese Patent Application No. Hei-1-254439 and a method of using a bispyridinium salt as a crystal appearance controlling agent as described in Japanese Patent Application Nos. Sho-62-267476 and Hei-1-276527 are useful for providing a narrow grain size distribution and high sensitivity.

The high silver chloride content grains of the present invention have a silver chloride content of at least 80 mol %, preferably at least 90 mol %, and more preferably at least 95 mol %.

The residue remaining silver halide content of the high silver chloride content grains may be composed of silver bromide. In this case, a phase mainly composed of silver bromide may be localized near the surface of the grains, or the silver halide grains may be core/shell type grains.

The tabular silver halide grains of the present invention have an aspect ratio (diameter/thickness ratio) of at least 2/1, preferably from 2/1 to 20/1, and more preferably from 3/1 to 8/1.

The diameter of a tabular grain is the diameter of a circle having the same area as the projected area of the grain. In the present invention, the diameter of the tabular grain is at least 0.5 μm, and preferably from 0.7 to 4 μm.

The thickness of a tabular grain is the distance between two main parallel planes facing each other in the planes constituting the tabular grain. In the present invention, the thickness of the tabular grains is less than 0.5 μm, and preferably less than 0.3 μm.

The grain size distribution of the silver halide grains of the present invention may be monodisperse or polydisperse, but a monodisperse generally having a coefficient of variation of 25% or less and particularly from 10 to 20% is preferred. The coefficient of variation is a quotient obtained by dividing a standard deviation of grain size (expressed in terms of diameter of circle equivalent to projected area) by a mean grain size).

In the preparation of the silver halide grains of the present invention, a silver halide solvent may be used. Useful silver halide solvents include, for example, thiocyanates as described, e.g., in U.S. Pat. Nos. 2,222,264, 2,448,534, and 3,320,069; thioether compounds as described, e.g., in U.S. Pat. Nos. 3,271,157, 3,574,628, 3,704,130, 4,297,439, and 4,276,347; thion compounds and thiourea compounds as described, e.g., JP-A-53-144319, JP-A-53-82408, and JP-A-55-77737, and amine compounds as described, e.g., in JP-A-54-100717. Also, ammonia can be used as the silver halide solvent together with the above-described silver halides to the extent that adverse effects do not result.

In the present invention, a method for increasing the addition rate, addition amount, and addition concentration of an aqueous silver salt solution (e.g., an aqueous solution of $AgNO_3$) and an aqueous halide solution (e.g., an aqueous solution of NaCl) over time is preferably used for increasing the rate of growth of the grains in the production of the silver halide grains.

The above methods are described, e.g., in British Patent 1,335,925, U.S. Pat. Nos. 3,672,900, 3,650,757, and 4,242,445, JP-A-55-142329, JP-A-55-158124, JP-A-58-113927, JP-A-58-113928, JP-A-58-111934, and JP-A-58-111936.

The tabular silver halide emulsion of the present invention is not necessarily chemically sensitized but, if necessary, may be subjected to chemical sensitization.

Useful chemical sensitization methods include gold sensitization as described, e.g., in U.S. Pat. Nos. 2,448,060 and 3,320,069, sulfur sensitization using a sulfur-containing compound as described, e.g., in U.S. Pat. No. 2,222,264, selenium sensitization using a selenium compound, reduction sensitization with a tin salt, thiourea dioxide, polyamine, etc., as described, e.g., in U.S. Pat. Nos. 2,487,850, 2,518,698, and 2,521,925, and a combination of these methods.

For the silver halide emulsion of the present invention, a gold sensitization method, a sulfur sensitization method, or a combination thereof is particularly preferred.

The photographic silver halide emulsion of the present invention can further contain ordinary silver halide grains in addition to the silver halide grains of the invention.

In the photographic silver halide emulsion of the present invention containing tabular high silver chloride content grains, the tabular high silver chloride content grains account for at least 50%, preferably at least 70%, and particularly preferably at least 90% of the total projected area of all of the silver halide grains.

The photographic silver halide emulsion of the present invention may be mixed with other photographic silver halide emulsions and in this case, it is preferred that the tabular high silver chloride grains of the present invention account for at least 50% of the total projected area of the silver halide grains in such a mixed emulsion.

The photographic silver halide emulsion of the present invention may be spectrally sensitized by a methine dye, etc. Examples of spectral sensitizing dyes for use in the present invention include cyanine dyes, merocyanine dyes, complex cyanine dyes, complex merocyanine dyes, holopolar cyanine dyes, hemicyanine dyes, styryl dyes, and hemioxonol dyes. Particularly useful dyes include cyanine dyes, merocyanine dyes, and complex cyanine dyes.

The above dyes can contain a basic heterocyclic nucleus usually utilized for cyanine dyes, including a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus, a pyridine nucleus, etc.; a nucleus formed by fusing an aliphatic hydrocarbon ring to the above-noted nuclei, and a nucleus formed by fusing an aromatic hydrocarbon ring to the above-noted nuclei, such as an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus, a quinoline nucleus, etc., can be used for the above-described dyes. These nuclei may be substituted on carbon atoms thereof.

Merocyanine dyes or complex merocyanine dyes for use in the present invention may contain a 5-membered or 6-membered heterocyclic nucleus such as a pyrazoline-5-one nucleus, a thiohydantoin nucleus, a 2-thiooxazoline-2,4-dione nucleus, a thiazoline-2,4-dione nucleus, a rhodaine nucleus, a thiobarbituric acid, etc., as a nucleus having a ketomethylene structure.

Examples of sensitizing dyes for use in the present invention include the compounds described in Research Disclosure, Vol. 176 (RD 17643), IV, page 23 (December, 1978), and the literature references cited therein.

The spectral sensitizing dyes may be added to the silver halide emulsion at any step during the preparation of the emulsion. For example, the spectral sensitizing dyes may be added in the step after completing chemical sensitization but before coating, the spectral sensitizing dyes can be added simultaneously with the addition of a chemical sensitizer to simultaneously carry out spectral sensitization and chemical sensitized as described in U.S. Pat. Nos. 3,628,969 and 4,225,666, the spectral sensitizing dyes may be added before chemical sensitization as described in JP-A-58-113928, and the spectral sensitizing dyes may be added before completion of the precipitation of the silver halide grains to initiate the spectral sensitization.

Furthermore, the above-described spectral sensitizing dyes may be separately added at different times during the preparation of the emulsion as described in U.S. Pat. No. 4,225,666. Namely, a portion of the sensitizing dye may be added prior to chemical sensitization and the remainder can be added after chemical sensitization. Thus, the spectral sensitizing dyes may be added as in the method described in U.S. Pat. No. 4,183,756, or may be added at any step of forming the silver halide grains.

The amount of the spectral sensitizing dye added to the emulsion is from $4\times10^{-6}$ to $8\times10^{-3}$ mol, and preferably from $5\times10^{-5}$ to $2\times10^{-3}$ mol per mol of the silver halide.

The silver halide emulsion of the present invention can be used for color photographic light-sensitive materials and black-and-white light-sensitive materials.

The color photographic light-sensitive materials which advantageously contain the silver halide emulsion of the present invention include color photographic papers, color photographic films for photographing, color reversal films, etc., and the black-and-white light-sensitive materials include X-ray films, general photographic films for photographing, light-sensitive film for making printing plates, but the emulsion of the present invention is particularly preferably used for X-ray films.

There is no particular restriction on the photographic materials to which the emulsion of the present invention is applied. Additives for use in the silver halide emulsion of the present invention are described in Research Disclosures, Vol. 176 (RD 17643) and Vol. 187 (RD 18716).

The above noted portions of RD 17643 and RD 18716 concerning the use of additives are summarized in the following table.

| Kind of Additives | RD 17643 | RD 18716 |
|---|---|---|
| 1. Chemical Sensitizer | Page 23 | Page 648, right column |
| 2. Sensitivity Increasing Agent | — | Page 648, right column |
| 3. Spectral Sensitizer and Super Color Sensitizer | Pages 23 to 24 | Page 648, right column to page 649, right column |
| 4. Whitening Agent | Page 24 | — |
| 5. Antifoggant and Stabilizer | Pages 24 to 25 | Page 649, right column |
| 6. Light-Absorber, Filter Dye and Ultraviolet Absorber | Pages 25 to 26 | Page 649, right column to page 650, left column |
| 7. Stain Inhibitor | Page 25, right column | Page 650, left to right column |
| 8. Dye Image Stabilizer | Page 25 | — |
| 9. Hardener | Page 26 | Page 651, left column |
| 10. Binder | Page 26 | Page 651, left column |
| 11. Plasticizer Lubricant | Page 27 | Page 650, right column |
| 12. Coating Aid Surface Active Agent | Pages 26 to 27 | Page 650, right column |
| 13. Antistatic Agent | Page 27 | Page 650, right column |

Of the above-described additives, as anti-foggants and stabilizers, azoles (e.g., benzothiazolium salts, nitroimidazoles, nitrobenzimidazoles, chlorobenzimidazoles, bromobenzimidazoles, nitroindazoles, aminotriazoles, and benzotriazoles); heterocyclic mercapto compounds (e.g., mercaptothiazoles, mercaptobenzothiazoles, mercaptobezimidazoles, mercaptothiadiazoles, mercaptotetrazoles (particularly, 1-phenyl-5-mercaptotetrazole); mercaptopyrimidine, and mercaptotriazine); the above-noted heterocyclic mercapto compounds having a water-solubilizing group such as a carboxy group and a sulfon group; thioketo compounds such as oxazolinethione, etc.; azaindenes-[e.g., triazaindenes, tetraazaindenes (particularly, 4-hydroxy-substituted 1,3,3a,7-tetraazaindenes), and pentaazaindenes]; benzenethiosulfonic acids; benzenesulfinic acids; benzenesulfonamide, etc., are preferably used.

Color couplers for use in the present invention, include non-diffusible couplers having a hydrophobic group (i.e., a "ballast group") in the molecule thereof, or polymerized couplers are preferred. The coupler may be four-equivalent or two equivalent to silver ion. Furthermore, the silver halide emulsion of the present invention may further contain a colored coupler having a color correction effect or a DIR coupler which releases a development inhibitor upon development. Also, the emulsion may contain a colorless DIR coupling compound which forms a colorless product by a coupling reaction and releases a development inhibitor.

Examples of the magenta coupler for use in the present invention include 5-pyrazolone couplers, pyrazolobenzimidazole couplers, pyrazolotriazole couplers, pyrazolotetrazole couplers, cyanoacetylcoumarone couplers, and open-chain acylacetonitrile couplers. Examples of the yellow couplers are acylacetamide couplers (e.g., benzylacetanilides and pivaloylacetanilides). Also, examples of the cyan couplers are naphthol couplers and phenol couplers. As the cyan coupler, phenolic couplers having an ethyl group at the meta-position of the phenol, 2,5-diacylamino-substituted phenolic couplers, phenolic couplers having a phenylureido group at the 2-position and an acylamino group at the 5-position, and couplers having a sulfonamido group or an amido group at the 5-position of the naphthol as described in U.S. Pat. Nos. 3,772,002, 2,772,162, 3,758,308, 4,126,396, 4,334,011, 4,327,173, 3,446,622, 4,333,999, 4,451,559, and 4,427,767 are preferred in that the images thereby formed have an excellent fastness.

Two or more kinds of the above noted couplers may be incorporated in the same emulsion layer, or the same coupler may be incorporated into two or more different layers to satisfy the characteristics required for the photographic light-sensitive material.

The silver halide emulsion of the present invention may further contain a fading inhibitor and typical examples of the fading inhibitor are hydroquinones, 6-hydroxychromans, 5-hydroxycoumarans, spirochromans, p-alkoxyphenols, hindered phenols such as bisphenols, etc., gallic acid derivatives, methylenedioxybenzenes, aminophenols, hindered amines, and ether or ester derivatives formed by silylating or alkylating the phenolic hydroxy group of each of these compounds. Also, metal complexes such as bis(salicylaldoxymate) nickel complex and bis(N,N-dialkyldithiocarbamate) nickel complex can be used.

For processing the photographic light-sensitive material containing the silver halide emulsion of the present invention, known processes can be used and also known processing solutions can be used for this purpose.

The processing temperature is usually selected from the range of from 18° C. to 50° C., but the processing temperature may be lower than 18° C. or higher than 50° C. According to the intended application, a black-and-white process for forming silver images or a color development process including a development for forming color images can be used.

For black-and-white development, known developing agents such as dihydroxybenzenes (e.g., hydroquinone), 3-pyrazolidones (e.g., 1-phenyl-3-pyrazolidone), aminophenols (e.g., N-methyl-p-aminophenol) can be used alone or in combination thereof.

The color developer is generally composed of an alkaline aqueous solution containing a color developing agent. As the color developing agent, known primary aromatic amine color developing agents such as phenylenediamines [e.g., 4-amino-N,N-diethylaniline, 3-methyl-4-amino-N,N-diethylaniline, 4-amino-N-ethyl-N-(β-hydroxyethyl)aniline, 3-methyl-4-amino-N-ethyl-N-(β-methanesulfonamidoethyl ")aniline, and 4-amino-3-methyl-N-ethyl-N-(-β-methoxyethyl)aniline]can be used.

Other color developing agents for use in the present invention are described in L. F. A. Mason, *Photoqraphic Processinq Chemistry,* pages 226 to 229, (published by The Focal Press, 1966), U.S. Pat. Nos. 2,193,015 and 2,592,364, and JP-A-48-64933.

The developer may further contain a pH buffers such as sulfites, carbonates, borates, and phosphates of alkali metals and a development inhibitor or antifoggants such as bromides, iodides, and organic antifoggants.

Also, if necessary, the developer may further contain a water softener, a preservative such as hydroxylamine, etc., an organic solvent such as benzyl alcohol, diethylene glycol, etc., a development accelerator such as polyethylene glycol, quaternary ammonium salts, amines, etc., a dye-forming coupler, a competing coupler, a fogging agent such as sodium boron hydride, etc., an auxiliary developing agent such as 1-phenyl-3-pyrazolidone, etc., a tackifier, the polycarboxylic acid series chelating agent described in U.S. Pat. No. 4,083,723, and the antioxidant described in West German Patent Application (OLS) 2,622,950.

Furthermore, in the development processing of the photographic material containing the silver halide emulsion of the present invention, the developer may further contain a silver staining inhibitor such as the compounds described in JP-A-56-24347.

The developer for use in accordance with the present invention can contain an amino compound such as the alkanolamine described in JP-A-56-106244.

Additionally the compounds described in L. F. A. Mason, *Photoqraphic Processing Chemistry,* pages 226–229, (published by The Focal Press, (1966)), U.S. Pat. Nos. 2,193,015 and 2,592,364, and JP-A-48-64933 can be also used in the developer.

A fix solution for processing a photographic material containing the silver halide emulsion of the present invention is an aqueous solution containing a thiosulfate having a pH of at least 3.8, preferably from 4.2 to 7.0, and more preferably from 4.5 to 5.5.

Useful fixing agents include sodium thiosulfate and ammonium thiosulfate, but ammonium thiosulfate is particularly preferred in view of its rapid fixing rate. The amount of the fixing agent varies depending on the intended application, but is generally from about 0.1 mol/liter to about 6 mol/liter.

The fix solution may contain a water-soluble aluminum salt as a hardening agent, and examples of the aluminum compound are aluminum chloride, aluminum sulfate, and potassium alum.

Also, the fix solution can further contain tartaric acid, citric acid, gluconic acid and the derivatives thereof alone or as a mixture thereof. The addition amount of these additives is effectively at least 0.005 mol, and particularly from 0.01 mol/liter to 0.03 mol/liter per liter of the fix solution.

The fix solution can, if desired, contain a preservative (e.g., sulfites and hydrogensulfites), a pH buffer (e.g., acetic acid and boric acid), a pH controlling agent (e.g., sulfuric acid), a chelating agent having a water softening ability, and the compound described in JP-A-62-78551.

For rapid processing, it is advantageous to reduce the swelling percentage (preferably from 150% to 50%) of the photographic light-sensitive material and to reduce the hardening action by processing. For the measurement of swelling percentage, a reference may be made to U.S. Pat. No. 4,414,304. Thus, hardening is preferably not conducted during development or fixing. The hardening reaction in fixing is diminished by increasing the pH of the fix solution above 4.6.

In the processing of the silver halide photo-graphic material containing the emulsion of the present invention, after the development and fix step, the photographic material can be processed with wash water or a stabilization solution having a replenishment rate of less than 3 liters (including 0, i.e., water washing with stored water) per square meter of the photographic material processed.

In other words, in the processing of a photographic material containing the emulsion of the present invention, water-saving processing is practically conducted and also plumbing for an automatic processor is not necessarily required.

As a method of reducing the amount of the water washing replenisher, a multistage (e.g., 2 or 3 stage) countercurrent system may be used. When the multistage countercurrent system is applied for processing a photographic light-sensitive materials containing the silver halide emulsion of the present invention, the light-sensitive material is successively processed with a cleaner processing solution (without being stained by the residual fix solution), such that washing is carried out more efficiently.

For the above-described water-saving processing or non-plumbing processing, it is preferred to apply an antifungal treatment to the wash water or the stabilization solution.

Useful antifungal treatments include a method of irradiating ultraviolet rays as described in JP-A-60-26393, a method of using a magnetic field as described in JP-A-60-263940, a method of forming pure water using ion-exchange resins as described in JP-A-61-131632, and a method of using antibacterial agents as described in JP-A-62-115439, JP-A-62-153952, JP A-62-220951, and A-2-209532.

Furthermore, the antibacterial agents, antifungal agents, surface active agents, etc., described in L. E. West, "Water Quality Criteria", *Photo. Sci. & Eng.*, Vol. 9, No. 6, (1965), M. W. Beach, "Microbiological Growth in Motion-Picture Processing", *SMPTE Journal*, Vol. 85, (1976), R. O. Deegan, "Photo Processing Wash Water Biocides", *J. Imaging Tech.* 10, No. 6 (1984), and JP-A-57-8542, JP-A-57-58143, JP-A-58-105145, JP-A-57-132146, JP-A-58-18631, JP-A-57-97530, JP-A-57-157244, etc., can also be used.

Moreover, the wash bath or the stabilization bath can contain the isothiazoline series compounds described in Kriman, *J. Image Tech* 10, (6), 242(1984), the isothiazoline series compounds described in *Research Disclosure*, Vol. 205, RD 20526 (May, 1981), the isothiazoline compounds described in ibid., Vol. 228, RD 22845 (April, 1983), and the compounds described in JP-A-62-209532 as microbiocides.

When wash step is carried out using a small amount of wash water, it is preferred to use a wash bath having a squeeze roller as described in JP-A-62-32460. Also, the wash step constitution described in JP-A-63-143548 is preferably used.

When the silver halide light-sensitive material containing the silver halide emulsion of the present invention is processed by an automatic processor including the steps of at least development, fix, and wash (or stabilization), the steps from development to drying are preferably completed within 50 seconds. Namely, the time from immersion of the top end of the light-sensitive material in the developer to the time that the top end emerges from a drying zone after being fixed, washed (or stabilized) and dried (i.e., the dry-to-dry time), is not more than 50 seconds. It is more preferred that the dry-to-dry time is not more than 30 seconds.

The reason that rapid processing having a dry-to-dry time of not more than 50 seconds can be attained is that the development process can be carried out within 15 seconds. The development temperature is preferably from 25° C. to 50° C., and more preferably from 30° C. to 40° C.

Also, the fixing temperature and time are preferably from about 20° C. to about 50° C. and 5 seconds to 20 seconds, and more preferably from 30° C. to 40° C. and from 5 seconds to 10 seconds.

Furthermore, the wash or stabilization temperature and time are preferably from 0° C. to 50° C. and from 5 seconds to 20 seconds, and more preferably from 15° C. to 40° C. and from 5 seconds to 15 seconds.

In accordance with the present invention, the processing fluids remaining wash water in or on the photographic light-sensitive material after being developed, fixed and washed (or stabilizer) is preferably removed by drying through a squeeze roller. Drying is carried out at a temperature of from about 40° C. to about 100° C. and the drying time can be properly adjusted according to the surrounding ambient conditions and is usually from about 5 seconds to 20 seconds, and more preferably from about 5 seconds to 10 seconds at a temperature of from 40° C. to 80° C.

When the photographic light-sensitive material containing the silver halide emulsion of the present invention is processed in a dry-to-dry time of not more than 50 seconds, and to prevent the formation of uneven development which tends to occur in rapid processing, a rubber roller is preferably applied to the roller at the outlet of the development tank as described in JP-A-63-151943, or the jet speed for stirring the developer in the developing tank is increased to at least 10 meters/min. as described in JP-A-63-151944.

Furthermore, for increasing the fixing speed or for increasing the dissolving speed of dyes contained in the light-sensitive material, the roller construction of the fixing tank preferably employs a counter roller. By employing a counter roller, the number of rollers is reduced and the processing tank size can be reduced. That is, a compact automatic processor can be employed for processing a light-sensitive material containing the silver halide emulsion of the present invention.

The invention is further described in detail by reference to the following examples, but the invention is not to be construed as being limited to these examples.

EXAMPLE 1

Preparation of Comparison Cubic Grain Silver Chlorobromide Emulsion 1

To an aqueous solution of 3% limed gelatin was added 3.3 g of sodium chloride followed by addition of 3.2 ml of an aqueous solution of 1% N,N'-dimethylimidazolidine-2-thione. To the solution were added an aqueous solution containing 34 g of silver nitrate and an aqueous solution containing 0.476 g of potassium bromide and 11.47 g of sodium chloride (1st addition) at 63° C. with vigorous stirring. Then, an aqueous solution containing 136 g of silver nitrate and an aqueous solution containing 1.904 g of potassium bromide and 45.86 g of sodium chloride (2nd addition) were added thereto with vigorous stirring at 63° C. After keeping the mixture at 63° C. for 5 minutes, the temperature was lowered and the mixture was desalted and washed with water. Furthermore, 90.0 g of limed gelatin was added to the emulsion thus obtained, and pH and pAg thereof were adjusted to 7.1 and 7.5, respectively. The silver halide emulsion thus obtained contained cubic silver halide grains having a side length of 0.8 μm.

Preparation of Comparison Cubic Grain Silver Chlorobromide Emulsion 2

The same procedure as for preparing comparison emulsion-1 was employed except that iron was added to the aqueous alkali halide solutions being added in the 1st and 2nd additions in the form of an aqueous solution of $K_4[Fe(CN)_6]$ in an amount of $1\times10^{-4}$ mol per mol of silver in the system, to prepare the comparison emulsion 2.

Preparation of Comparison Cubic Grain Silver Chlorobromide Emulsion 3

The same procedure as for preparing comparison emulsion-1 was employed except that ruthenium was added to the aqueous alkali halide solutions being added in the 1st and 2nd additions in the form of an aqueous solution of $K_4[Ru(CN)_6]$ in an amount of $1\times10^{-4}$ mol per mol of silver in the system, to prepare the comparison emulsion 3.

Preparation of Comparison Cubic Grain Silver Chloride Emulsion 4

To an aqueous solution of 3% limed gelatin was added 3.3 g of sodium chloride followed by addition of 3.2 ml of an aqueous solution of 1% N,N'-dimethylimidazolidine-2-thione. To the solution were added an aqueous solution containing 34 g of silver nitrate and an aqueous solution containing 11.7 g of sodium chloride (1st addition) with vigorous stirring at 63° C. Then, an aqueous solution containing 136 g of silver nitrate and an aqueous solution containing 46.8 g of sodium chloride were added thereto (2nd addition) with vigorous stirring at 63° C. After keeping the emulsion thus obtained at 63° C. for 5 minutes, the temperature was lowered, and the emulsion was desalted and washed with water. Furthermore, 90.0 g of limed gelatin and 3 g of phenoxy ethanol were added, and the pH and pAg thereof were adjusted to 7.1 and 7.5, respectively.

The silver halide emulsion thus obtained contained cubic silver halide grains having an edge length of 0.78 μm.

Preparation of Comparison Cubic Grain Silver Chloride Emulsion 5

The same procedure as for preparing comparison example 4 was employed, except that iron was added to the aqueous alkali halide solutions being added in the 1st and 2nd additions in the form of an aqueous solution of $K_4[Fe(CN)_6]$ in an amount of $1\times10^{-4}$ mol per mol of silver in the system, to prepare the comparison emulsion 5.

Preparation of Comparison Cubic Grain Silver Chloride Emulsion 6

The same procedure as for preparing comparison emulsion 4 was employed, except that ruthenium was added to the aqueous alkali halide solutions being added in the 1st and 2nd additions in the form of an aqueous solution of $K_4[Ru(CN)_6]$ in an amount of $1\times10^{-4}$ mol per mol of silver in the system, to prepare the comparison emulsion 6.

Preparation of Comparison Tabular Grain Silver Chlorobromide Emulsion 7

By referring to the method described in Example 1 of JP-A-63-281149, a tabular grain silver chlorobromide emulsion containing 1.5 mol % silver bromide was formed. In this case, 0.08 g of 4-aminopyrazolo[3,4,d]-pyrimidine was added as a crystal growth modifier, and the pH value was adjusted to 4.5.

After forming the silver halide grains, the temperature was lowered and the emulsion thus formed was desalted and washed with water. Furthermore, after adding gelatin, the pH and pAg thereof were adjusted to 7.1 to 7.5, respectively. The weight ratio of gelatin to silver nitrate was adjusted to the same value (by weight) as that of comparison emulsions 1 to 6.

The tabular silver halide grains thus obtained had a thickness of 0.19 μm, a diameter of 1.45 μm, and an aspect ratio of 7.6.

Preparation of Tabular Grain Silver Chlorobromide Emulsion 8 of the Invention The same procedure as for preparing Comparison Example 7 was employed, except that iron was added in the form of an aqueous solution of $K_4[Fe(CN)_6]$ to the aqueous alkali halide solutions in an amount of $1\times10^{-4}$ mol per mol of silver in the system, to prepare the emulsion 8 of the invention.

Preparation of Tabular Grain Silver Chlorobromide Emulsion 9 of the Invention The same procedure as for preparing Comparison Example 7 was employed, except that ruthenium was added to the aqueous alkali halide solutions in the form of an aqueous solution of $K_4[Ru(CN)_6]$ in an amount of $1\times10^{-4}$ mol per mol of silver in the system, to prepare the emulsion 9 of the present invention.

Preparation of Comparison Tabular Grain Silver Chloride Emulsion 10

The silver chloride emulsion was prepared as follows.

| Solution (1): | |
|---|---|
| Inactive Gelatin | 30 g |
| Adenine Sulfate $[(C_5H_5N_5)_2.H_2SO_4.2H_2O]$ | 0.186 g |

-continued

| | |
|---|---|
| NaCl | 7.8 g |
| Water | 1450 ml |
| Solution (2): | |
| $AgNO_3$ | 20 g |
| Water to make | 50 ml |
| Solution (3): | |
| NaCl | 6.5 g |
| Water to make | 50 ml |
| Solution (4): | |
| $AgNO_3$ | 150 g |
| Water to make | 400 ml |
| Solution (5): | |
| NaCl | 52 g |
| Water to make | 400 ml |

The pH value of the solution (1) containing adenine sulfate and NaCl maintained at 75° C. was adjusted to 7.0 and while vigorously stirring the solution, the solution (2) and the solution (3) were simultaneously added to the solution over a period of 5 minutes at constant addition rates. Then, the solution (4) and the solution (5) were simultaneously added thereto at constant addition rates over a period of 40 minutes to provide a silver chloride emulsion.

After desalting by flocculation and washing with water, 90 g of gelatin and 3 g of phenoxy ethanol were added to the emulsion, and pH and pAg thereof were adjusted to 7.1 and 7.5, respectively The tabular silver halide grains thus prepared had a diameter of 1.4 μm, a thickness of 0.20 μm, and an aspect ratio of 7.0.

Preparation of Tabular Grain Silver Chloride Emulsion 11 of the Invention

The same procedure as for preparing the emulsion 10 was employed, except that iron was added to the solution (5) in the form of an aqueous solution of $K_4[Fe(CN)_6]$ in an amount of $1\times10^{-4}$ mol per mol of silver in the system, to prepare the emulsion 11 of the invention.

Preparation of Tabular Grain Silver Chloride Emulsion 12 of the Invention

The same procedure as for preparing the emulsion 10 was employed, except that ruthenium was added to the solution (5) in the form of an aqueous solution of $K_4[Ru(CN)_6]$ in an amount of $1\times10^{-4}$ mol per mol of silver in the system, to prepare the emulsion 12 of the invention.

Preparation of Emulsion Coating Composition

To each of the emulsions 1 to 12 were added the following components per mol of silver halide to provide corresponding coating compositions.

| | |
|---|---|
| Polymer Latex: [poly(ethyl acrylate/methacrylic acid) = 97/3] | 20.0 g |
| Hardening Agent: 1,2-Bis(vinylsulfonyl-acetamido)ethane | 2.4 g |
| 2,6-Bis(hydroxyamino)-4-diethylamino-1,3,5-triazine | 76 mg |
| Sodium Polyacrylate (mean molecular weight 41,000) | 2.1 g |
| Potassium Polystyrenesulfonate (mean molecular weight 600,000) | 1.0 g |
| Dextran (molecular weight 39,000) | 23.6 g |
| Trimethylolpropane | 9.8 g |

-continued

| | |
|---|---|
| 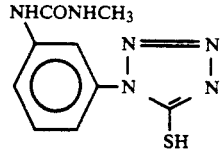 | 0.03 g |

Preparation of Support

A base was prepared by forming a subbing layer having a coated amount of gelatin of 84 mg/m² on a polyethylene terephthalate base of 175 μm in thickness.

Preparation of Photographic Material

Each of the above-described coating compositions were simultaneously coated on the above-noted support together with the following coating composition for a surface protective layer. The silver halide coverage was 2.0 g/m² (in terms of silver).

The coating composition for the surface protective layer is as shown below. Thus, photographic light-sensitive materials 1 to 12 as shown in Table 1 were prepared.

| Content of Surface Protective Layer | Coated Amount |
|---|---|
| Gelatin | 1.138 g/m² |
| Dextran (mean molecular weight 39,000) | 0.228 g/m² |
| 4-Hydroxy-6-methyl-1,3,3a,7-tetraazaindene | 0.0155 g/m² |
| Sodium Polyacrylate (mean molecular weight 400,000) | 0.023 g/m² |
| 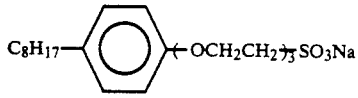 | 0.0225 g/m² |
| $C_{16}H_{33}O(CH_2CH_2O)_{10}H$ | 0.035 g/m² |
| $C_8F_{17}SO_2N(C_3H_7)(CH_2CH_2O)_4(CH_2)_4SO_3Na$ | 0.005 g/m² |
| $C_8F_{17}SO_3K$ | 0.0053 g/m² |
| Polymethyl Methacrylate (mean grain size 3.7 μm) | 0.088 g/m² |
| Proxicel (available from I.C.I. Co) | 0.0006 g/m² |

Exaluation of Photographic Performance

Each of the photographic materials 1 to 12 thus prepared was imagewise exposed for 1/50 sec. using a light source of 365.5 nm in wavelength and processed using following developer (I) and fix solution (I), and then dried.

| | |
|---|---|
| Developer (I) | |
| Hydroquinone | 10 g |
| 4-Hydromethyl-4-methyl-1-phenyl-3-pyrazolidone | 1 g |
| Potassium Chloride | 10 g |
| Ascorbic Acid | 10 g |
| pH adjusted to | 9.5 |
| Water to make | 1 liter |
| Fix Solution (I) | |
| Ammonium Thiosulfate | 200 g |
| Sodium Sulfite (anhydrous) | 20 g |
| Boric Acid | 8 g |
| Ethylenediaminetetraacetic Acid | 0.1 g |

-continued

| | |
|---|---|
| Di-Sodium | |
| Aluminum Sulfate | 15 g |
| Sulfuric Acid | 2 g |
| Glacial Acetic Acid | 22 g |
| Water to make | 1.0 liter |
| pH adjusted to | 4.2 |

The development was carried out for 15 seconds at 30° C. and the fix was carried out for 10 seconds at 30° C.

The sensitivity was evaluated as the reciprocal of the exposure amount necessary for obtaining blackened extent of 0.3+fog value, relative to the sensitivity of photographic material 1 defined as 100.

The results are shown in Table 1.

TABLE 1

| Photographic Material | Halogen Composition | Grain Form | Metal Salt Used | Amount of Metal Salt (mol/mol-Ag) | Sensitivity |
|---|---|---|---|---|---|
| 1 | Cl 98 mol %, Br 2 mol % | Cubic | None | 0 | 100 |
| 2 | Cl 98 mol %, Br 2 mol % | " | $K_4[Fe(CN)_6]$ | $1 \times 10^{-4}$ | 105 |
| 3 | Cl 98 mol %, Br 2 mol % | " | $K_4[Ru(CN)_6]$ | $1 \times 10^{-4}$ | 105 |
| 4 | Cl 100 mol % | " | None | 0 | 100 |
| 5 | " | " | $K_4[Fe(CN)_6]$ | $1 \times 10^{-4}$ | 115 |
| 6 | " | " | $K_4[Ru(CN)_6]$ | $1 \times 10^{-4}$ | 110 |
| 7 | Cl 98.5 mol %, Br 1.5 mol % | Tabular | None | 0 | 90 |
| 8* | Cl 98.5 mol %, Br 1.5 mol % | Tabular | $K_4[Fe(CN)_6]$ | $1 \times 10^{-4}$ | 120 |
| 9* | Cl 98.5 mol %, Br 1.5 mol % | Tabular | $K_4[Ru(CN)_6]$ | $1 \times 10^{-4}$ | 120 |
| 10 | Cl 100 mol % | " | None | 0 | 90 |
| 11* | " | " | $K_4[Fe(CN)_6]$ | $1 \times 10^{-4}$ | 135 |
| 12* | " | " | $K_4[Ru(CN)_6]$ | $1 \times 10^{-4}$ | 130 |

*Invention

From the results shown in Table 1, it is seen that in the comparison of emulsions 1, 4, 7, and 10 containing no metal salt, cubic silver halide grains have a higher sensitivity than tabular silver halide grains. This result is obtained because the light absorption of tabular silver halide grains is less than that of cubic silver halide grains. However, when the silver halide grains are formed in the presence of iron or ruthenium, the tabular silver halide grains exhibit remarkedly higher sensitivity than the cubic silver halide grains despite less light absorption. The above results clearly show the effect of the present invention.

EXAMPLE 2

Preparation of Comparison Cubic Grain Emulsion 13

A silver halide emulsion was prepared in the same manner as emulsion 4 of Example 1. However, in this case, after completing the 1st and 2nd additions of the alkali halide, an aqueous solution containing 1.19 g of potassium bromide was added to carry out halogen conversion at the surface of the silver halide grains. Thereafter, the emulsion was dealt and washed. Then, 90 g of gelatin and 3 g of phenoxy ethanol were added, and the pH and pAg were adjusted to 6.5 and 7.5, respectively, to obtain the emulsion 13.

Preparation of Comparison Cubic Grain Emulsion 14

The same procedure as for preparing emulsion 13 was employed, except that iron was added to the aqueous alkali halide solutions being added in the 1st and 2nd additions in the form of an aqueous solution of $K_4[Fe(CN)_6]$ in an amount of $1 \times 10^{-4}$ mol per mol of silver in the system, to prepare the emulsion 14.

Preparation of Comparison Tabular Emulsion 15

A silver halide emulsion was prepared in the same manner as emulsion 10 in Example 1. However, in this case, after completing the addition of the solutions (4) and (5) an aqueous solution containing 1.19 g of potassium bromide was added to the emulsion to carry out halogen conversion of the surface of the silver halide grains.

Then, after desalting and washing with water, 90 g of gelatin and 3 g of phenoxy ethanol were added to the emulsion, and the pH and pAg thereof were adjusted to 6.5 and 7.5, respectively, to obtain the emulsion 15.

Preparation of Tabular Grain Emulsion 16 of the Invention

A silver halide emulsion was prepared in the same manner as emulsion 11 in Example 1.

In this case, however, after completing the addition of the solutions (4) and (5), an aqueous solution containing 1.19 g of potassium bromide was added to the emulsion to carry out halogen conversion of the surface of the silver halide grains.

Preparation of Photographic Materials and Evaluation

By following the same procedure as Example 1, photographic materials 13 to 16 were prepared and were evaluated as in Example 1.

The results obtained are shown in Table 2 below.

TABLE 2

| Photographic Material | Halogen Composition | Grain Form | Metal Salt Used | Amount of Metal Salt (mol/mol-Ag) | Sensitivity |
|---|---|---|---|---|---|
| 4 | Cl 100 mol % | Cubic | None | 0 | 100 |
| 13 | Cl 99 mol %, Br 1 mol % (Halogen conversion) | " | None | 0 | 145 |
| 14 | Cl 99 mol %, Br 1 mol % (Halogen conversion) | " | $K_4[Fe(CN)_6]$ | $1 \times 10^{-4}$ | 160 |
| 10 | Cl 100 mol % | Tabular | None | 0 | 90 |
| 15 | Cl 99 mol %, Br 1 mol % (Halogen conversion) | " | None | 0 | 130 |
| 16* | Cl 99 mol %, Br 1 mol % (Halogen conversion) | " | $K_4[Fe(CN)_6]$ | $1 \times 10^{-4}$ | 195 |

*Invention

From the results shown in Table 2, it can be seen that the effects of the present invention are further enhanced by using silver halide grains subjected to halogen conversion.

EXAMPLE 3

Preparation of Comparison Cubic Grain Emulsion 17

The same procedure as for preparing emulsion 5 was employed to prepare a silver halide emulsion which was not chemically sensitized. In this case, however, the pH and pAg were adjusted to 7.1 and 6.95, respectively.

To the emulsion, the following components were successively added to chemically sensitize the emulsion at 60° C.

| | (per mol of silver) |
|---|---|
| NaCl | $1.79 \times 10^{-2}$ mol |
| KBr | $1 \times 10^{-2}$ mol |
| Chloroauric Acid | $5 \times 10^{-5}$ mol |
| Sodium Thiosulfate | $5 \times 10^{-5}$ mol |
| 4-Hydroxy-6-methyl-1,3,3a,7-tetraazaindene | $5 \times 10^{-3}$ mol |

Chemical ripening was carried out for 30 minutes after adding 4 hydroxy-6-methyl-1,3,3a,7-tetraazaindene.

Preparation of Tabular Grain Emulsion 18 of the Invention

The same procedure as for preparing the emulsion 11 of invention was employed to prepare emulsion which was not chemically sensitized. In this case, however, the pH and pAg thereof were adjusted to 7.1 and 6.95, respectively. The silver halide was then chemically sensitized in the same manner as emulsion 17 to obtain the emulsion 18 of the invention.

Preparation of Comparison Tabular Grain Emulsion 19

A silver chlorobromide emulsion was prepared as follows.

| | |
|---|---|
| Solution (1): | |
| Inactive Gelatin | 30 g |
| 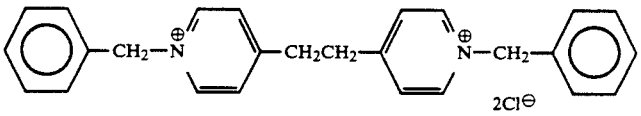 | 0.8 g |
| NaCl | 4 g |
| Water to make | 1750 ml |
| Solution (2): | |
| $AgNO_3$ | 34 g |
| Water to make | 200 ml |
| Solution (3): | |
| NaCl | 12.5 g |
| Water to make | 200 ml |
| Solution (4): | |
| $AgNO_3$ | 102 g |
| Water to make | 600 ml |
| Solution (5): | |
| NaCl | 37.5 g |
| Water to make | 600 ml |

To the solution (1) kept at 35° C. with vigorous stirring were simultaneously added the solution (2) and the solution (3) over a period of 10 minutes.

Furthermore, after raising the temperature of the mixture to 75° C., the solution (4) and the solution (5)

were simultaneously added thereto over a period of 30 minutes.

The emulsion was desalted by an ordinary flocculation method and washed with water, and after adding thereto gelatin, the pH and pAg were adjusted to 6.4 and 7.5 at 40° C. to provide a tabular grain silver chloride emulsion.

The silver chloride emulsion thus prepared contained more than 80% (projected area) tabular grains having a thickness of less than 0.5 μm, a diameter of at least 0.5 μm, and aspect ratio of 2 or more and having parallel (111) planes. The tabular silver halide grains had a mean projected area of 1.8 $\mu m^2$, a mean thickness of 0.22 μm, and a mean aspect ratio of 6.9.

To the tabular silver chloride emulsion was added a superfine grain silver bromide emulsion (grain size of about 0.05 μm) in an amount to provide 1 mol % silver bromide to silver chloride, and ripening was carried out for 10 minutes at 60° C. to provide an emulsion before chemical sensitization.

After adjusting, the pH and pAg of the emulsion to 7.1 and 7.8, respectively, the following components were successively added to chemically sensitize the emulsion at 60° C.

| | (per mol of silver) |
|---|---|
| NaCl | $1.79 \times 10^{-2}$ mol |
| Chloroauric Acid | $5 \times 10^{-2}$ mol |
| Sodium Thiosulfate | $2 \times 10^{-5}$ mol |
| 4-Hydroxy-6-methyl-1,3,3a,7-tetraazaindene | $5 \times 10^{-3}$ mol |

The chemical ripening time was 30 minutes.

Preparation of Tabular Grain Emulsion 20 of the Invention

The same procedure as for preparing the emulsion 19 was employed, except that iron was added to the solution (5) in the form of an aqueous solution of $K_4[Fe(CN)_6]$ in an amount of $1 \times 10^{-4}$ per mol of silver in the system. Then, the emulsion was chemically sensitized in the same manner as emulsion 19.

Preparation of Photographic Materials and Evaluation

Photographic materials 17 to 20 were prepared and evaluated in the same manner as in Example 1. The development process was carried out for 10 seconds at 35° C.

The results are shown in Table 3 below, wherein the sensitivity is indicated relative to the photographic material 4 defined as 100.

TABLE 3

| Photographic Material | Halogen Composition | Grain Form | Metal Salt Used | Amount of Metal Salt (mol/mol-Ag) | Chemical Sensitization | Sensitivity |
|---|---|---|---|---|---|---|
| 4 | Cl 100 mol % | Cubic | None | 0 | None | 100 |
| 17 | Cl 99 mol %, Br 1 | " | $K_4[Fe(CN)_6]$ | $1 \times 10^{-4}$ | Gold sensitization + sulfur sensitization | 8500 |
| 18* | Cl 99 mol %, Br 1 | Tabular | $K_4[Fe(CN)_6]$ | $1 \times 10^{-4}$ | Gold sensitization + sulfur sensitization | 11200 |
| 19 | Cl 99 mol %, Br 1 | " | None | 0 | Gold sensitization + sulfur sensitization | 7950 |
| 20* | Cl 99 mol %, Br 1 | " | $K_4[Fe(CN)_6]$ | $1 \times 10^{-4}$ | Gold sensitization + sulfur sensitization | 12600 |

*Invention

While the invention has been described in detail and with reference to specific embodiments thereof, it will be apparent to one skilled in the art that various changes and modifications can be made therein without departing from the spirit and scope thereof.

What is claimed is:

1. A photographic silver halide emulsion comprising silver chorobromide grains containing at least 98.5 mol % silver chloride or silver chloride grains, wherein tabular grains having a thickness of less than 0.5 μm, a diameter of at least 0.5 μm and an aspect ratio of at least 2/1 account for at least 50% of the total projected area of the silver halide grains, and said tabular grains are formed in the presence of a compound of a metal belonging to Group VIII of the Periodic Table selected from the group consisting of iron, ruthenium and osmium.

2. A photographic silver halide emulsion as in claim 1, wherein the compound of a metal belonging to Group VIII of the Periodic Table is present in an amount of from $1 \times 10^{-8}$ to $1 \times 10^{-2}$ mol per mol of silver halide contained in the emulsion.

3. A photographic silver halide emulsion as in claim 1, wherein the tabular grains have an aspect ratio of from 3/1 to 8/1.

4. A photographic silver halide emulsion as in claim 1, wherein the tabular grains have a diameter of from 0.7 to 4 μm.

5. A photographic silver halide emulsion as in claim 1, wherein the tabular grains have a thickness of less than 0.3 μm.

6. A photographic silver halide emulsion as in claim 1, wherein the tabular grains account for at least 70% of the total projected area of the silver halide grains.

7. A photographic silver halide emulsion as in claim 1, wherein the silver chlorobromide grains contain at least 99% mol % silver chloride.

8. A photographic silver halide emulsion as in claim 1, wherein said tabular grains comprise a localized silver bromide phase near the surface of the grains.

9. A light-sensitive silver halide photographic material comprising a support having thereon at least one hydrophilic colloid layer, at least one layer of which is a light-sensitive silver halide emulsion layer comprising silver chlorobromide grains containing at least 98.5 mol % silver chloride or silver chloride grains, wherein tabular grains having a thickness of less than 0.5 μm, a diameter of at least 0.5 μm and an aspect ratio of at least 2/1 account for at least 50% of the total projected area of the silver halide grains, and said tabular grains are formed in the presence of a compound of a metal belonging to Group VIII of the Periodic Table selected from the group consisting of iron, ruthenium and osmium.

* * * * *